(12) United States Patent
Xu et al.

(10) Patent No.: US 12,213,409 B1
(45) Date of Patent: Feb. 4, 2025

(54) ELECTRIC BAYBERRY PICKER WITH DIRECT COOLING AND FAST ENCAPSULATION BASED ON MACHINE VISION

(71) Applicant: HANGZHOU VOCATIONAL & TECHNICAL COLLEGE, Zhejiang (CN)

(72) Inventors: Gaohuan Xu, Zhejiang (CN); Chenwen Wang, Zhejiang (CN); Bo Zhang, Zhejiang (CN); Jing Jin, Zhejiang (CN); Jundong Jin, Zhejiang (CN); Lirong Chen, Zhejiang (CN); Jiaying Zhao, Zhejiang (CN)

(73) Assignee: HANGZHOU VOCATIONAL & TECHNICAL COLLEGE, Hangzhou (CN)

( * ) Notice: Subject to any disclaimer, the term of this patent is extended or adjusted under 35 U.S.C. 154(b) by 0 days.

(21) Appl. No.: 18/786,564

(22) Filed: Jul. 28, 2024

Related U.S. Application Data

(63) Continuation of application No. PCT/CN2023/128057, filed on Oct. 31, 2023.

(30) Foreign Application Priority Data

Aug. 3, 2023 (CN) .......................... 202310973242.8

(51) Int. Cl.
*A01D 46/24* (2006.01)
*A01D 46/30* (2006.01)
(Continued)

(52) U.S. Cl.
CPC .............. *A01D 46/24* (2013.01); *A01D 46/30* (2013.01); *A23B 7/0425* (2013.01); *A23B 7/055* (2013.01);
(Continued)

(58) Field of Classification Search
CPC ........................................... A01D 46/00–46/30
See application file for complete search history.

(56) References Cited

U.S. PATENT DOCUMENTS

2021/0337734 A1* 11/2021 Jeanty ..................... B25J 9/0087

FOREIGN PATENT DOCUMENTS

| CN | 206481621 | | 9/2017 | |
|----|-----------|---|--------|---|
| CN | 110089268 | A * | 8/2019 | ............. A01D 46/00 |

(Continued)

OTHER PUBLICATIONS

International Search Report Dated Apr. 17, 2024 for Corresponding PCT Application No. PCT/CN2023/128057.

(Continued)

*Primary Examiner* — Adam J Behrens
*Assistant Examiner* — Madeline I Runco

(57) ABSTRACT

An electric bayberry picker with direct cooling and fast encapsulation based on machine vision includes: a mechanical claw with at least three flexible fingers, wherein each flexible finger is equipped with a pressure sensor on one side facing the bayberry, and a collecting pipe is arranged at an enclosing center of all the flexible fingers; an image recognition device configured for positioning and recognizing maturity of the bayberry; a carbon dioxide spraying device for spraying carbon dioxide on a fruit stalk and around the bayberry to freeze the fruit stalk and reduce the surface temperature of the bayberry; a photoelectric sensor for detecting whether a bayberry exits an outlet of the collecting (Continued)

pipe; a liquid polyurethane foam spraying device for wrapping the bayberry exited the outlet of the collecting pipe with the liquid polyurethane foam; and a transportation device.

10 Claims, 6 Drawing Sheets

(51) Int. Cl.
  *A23B 7/04*  (2006.01)
  *A23B 7/055*  (2006.01)
  *A23B 7/16*  (2006.01)
  *G06V 10/26*  (2022.01)
  *G06V 10/28*  (2022.01)
  *G06V 10/30*  (2022.01)
  *G06V 10/764*  (2022.01)
  *G06V 20/68*  (2022.01)

(52) U.S. Cl.
  CPC ............... *A23B 7/16* (2013.01); *G06V 10/26* (2022.01); *G06V 10/28* (2022.01); *G06V 10/30* (2022.01); *G06V 10/764* (2022.01); *G06V 20/68* (2022.01)

(56) References Cited

FOREIGN PATENT DOCUMENTS

| | | | | |
|---|---|---|---|---|
| CN | 110278774 A | * | 9/2019 | ............. A01D 46/00 |
| CN | 110896731 A | * | 3/2020 | ............. A01D 46/24 |
| CN | 211378848 U | | 9/2020 | |
| CN | 113099844 A | | 7/2021 | |
| CN | 214757957 U | | 11/2021 | |
| CN | 114532064 A | | 5/2022 | |
| CN | 116394289 A | * | 7/2023 | |
| CN | 116830900 A | | 10/2023 | |
| JP | 08275655 A | | 10/1996 | |

OTHER PUBLICATIONS

Written Opinion of the International Searching Authority Dated Apr. 17, 2024 for Corresponding PCT Application No. PCT/CN2023/128057.

* cited by examiner

ELECTRIC BAYBERRY PICKER WITH DIRECT COOLING AND FAST ENCAPSULATION BASED ON MACHINE VISION

CROSS-REFERENCE TO RELATED APPLICATIONS

The present application is a Continuation Application of PCT Application No. PCT/CN2023/128057, filed on Oct. 31, 2023, which claims the priority of Chinese Patent Application No. 202310973242.8, filed on Aug. 3, 2023, the entire contents of which are hereby incorporated by reference.

TECHNICAL FIELD

The present disclosure relates to the technical field of the agricultural picker, and in particular, relates to an electric bayberry picker with direct cooling and fast encapsulation based on machine vision.

BACKGROUND

A fruit picker is an auxiliary apparatus used to assist in manual fruit picking, which enhances work efficiency. With the rapid development of the social economy, fruits are being produced and marketed in large quantities, which enriches people's dietary varieties and improves their quality of life. Nevertheless, in most regions of China, fruit picking still relies mainly on manual labor. Thus, the need for fruit-picking machinery with a well-structured design, improved picking efficiency, and guaranteed fruit quality has become imperative. Currently, the primary bayberry pickers prevalent on the market are grabbing picking machines designed as follows.

Chinese utility model patent application No. 201720142123.8 discloses a labor-saving electric bayberry picker, which includes a plurality of soft grippers, a gripper body, a gripper support, and a main bayberry picker support. Each soft gripper is rotatably installed on the gripper body and equipped with a reset device that expands the soft gripper and a stretching device that converges the soft gripper for picking. The stretching device includes an upper electromagnetic coil, a lower electromagnetic coil, and a control switch used to control the on-off of the current of the upper and lower electromagnetic coils. The upper electromagnetic coil is connected to the soft gripper and is slidable upward and downward relative to the lower electromagnetic coil. When powered on, the upper and lower electromagnetic coils are attracted close to each other, and the plurality of soft grippers are all in a closed state. When powered off, the upper and lower electromagnetic coils are separated from each other under the action of the reset device, with the plurality of soft grippers being in an open state.

However, the degree of expansion or convergence of the grippers of the picker is constant and is not adjustable according to the size of the bayberry, thus, the gripping force is not controllable, which can easily lead to mechanical damage to the fruit. Besides, the picker lacks functions such as image recognition, and the level of automation is poor. In addition, the bayberries in the conveyor basket will be exposed to vibration and friction during the picking process.

SUMMARY OF THE DISCLOSURE

An objective of embodiments of the present disclosure is to provide an electric bayberry picker with direct cooling and fast encapsulation based on machine vision to solve the problems of the existing bayberry picker, such as the inability to guarantee the fruit quality, tendency to damage the fruit, reliance on a single picking mode and inefficiency in assisting manual picking.

According to the embodiment of the present disclosure, an electric bayberry picker with direct cooling and fast encapsulation based on machine vision is provided, which includes:

- a mechanical claw with at least three flexible fingers each equipped with a pressure sensor on a side facing a bayberry, with a collecting pipe arranged at an enclosing center of all the flexible fingers;
- an image recognition device configured for positioning and recognizing maturity of the bayberry;
- a carbon dioxide spraying device, configured to spray carbon dioxide on a fruit stalk and around the bayberry to freeze the fruit stalk and reduce surface temperature of the bayberry;
- a photoelectric sensor configured to detect whether a bayberry exits an outlet of the collecting pipe;
- a liquid polyurethane foam spraying device for wrapping liquid polyurethane foam on the bayberry exited the outlet of the collecting pipe;
- a transport device configured for transporting the bayberry wrapped with liquid polyurethane foam, wherein the transport device comprises a conveyor belt mechanism and a fruit rack fixed on the conveyor belt mechanism, and the fruit rack moves along with a conveyor belt on the conveyor belt mechanism; and
- a control processing device configured to control the carbon dioxide spraying device to spray carbon dioxide on the fruit stalk and around the bayberry according to positioning and recognition results of the image recognition device; control the mechanical claw to grasp the bayberry; control grasping strength of the mechanical claw according to pressure signals collected by pressure sensors; control the mechanical claw to release the bayberry to allow the same to drop into the collecting pipe automatically after being tugged and picked; control the liquid polyurethane foam spraying device to spray liquid polyurethane foam on the bayberry once the photoelectric sensor detects it exiting the outlet of the collecting pipe; and control the transporting device to transport the bayberry which that has fallen into the fruit rack after being wrapped with liquid polyurethane foam.

The beneficial effects are described as follows:

The existing bayberry picking machinery faces problems such as the inability to guarantee the fruit quality, the tendency to damage the fruit, reliance on a single picking mode, and inefficiency in assisting manual picking. Given this, the present disclosure utilizes carbon dioxide to cool the surface of the fruit and freeze the fruit stalk before picking, which improves the quality of the picked fruit and facilitates its preservation. Furthermore, the mechanical claw is equipped with flexible picking fingers that skillfully form a deformable multi-rod mechanism, which combines with the integrated film pressure sensors thereof, this allows the mechanical claw of the electric bayberry picker to deform according to the shape of the fruits, to adjust the grasping force based on the size of the bayberry, and thus achieve fruit picking with minimal loss. After passing through the collecting pipe, the picked fruits are wrapped in liquid polyurethane foam and then transferred to the belt transport device equipped with a flexible buffer rack before finally being transported to the collection device.

Figure 1:
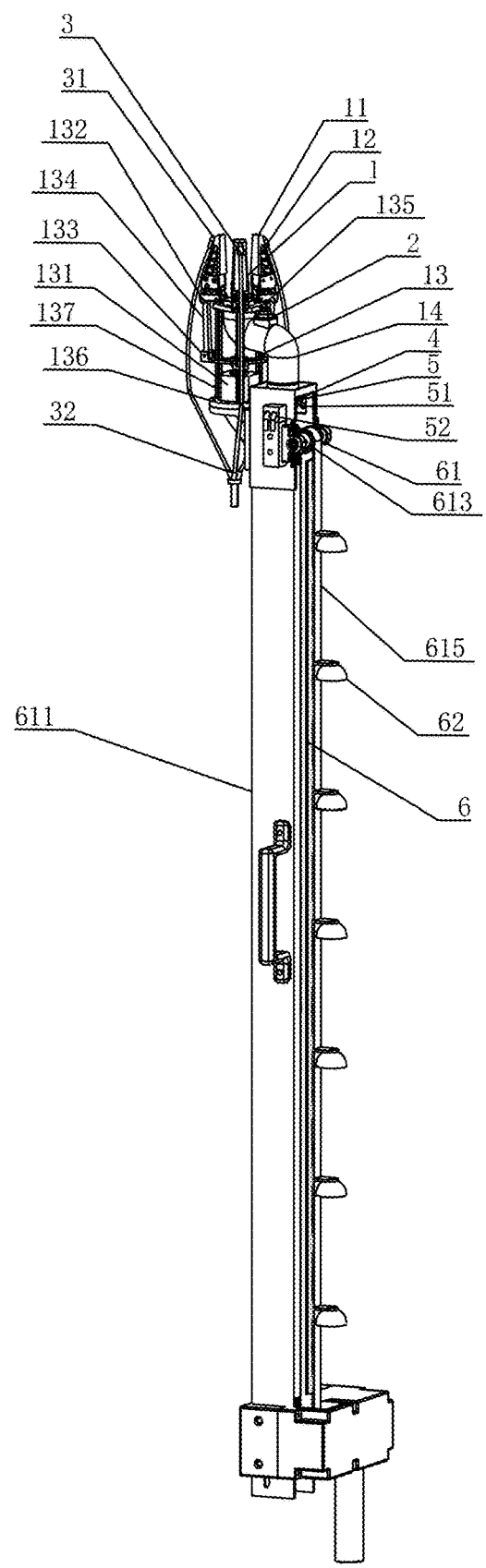
FIG. 1 is a schematic diagram of an electric bayberry picker with direct cooling and fast encapsulation based on machine vision according to an exemplary embodiment.
Figure 2:
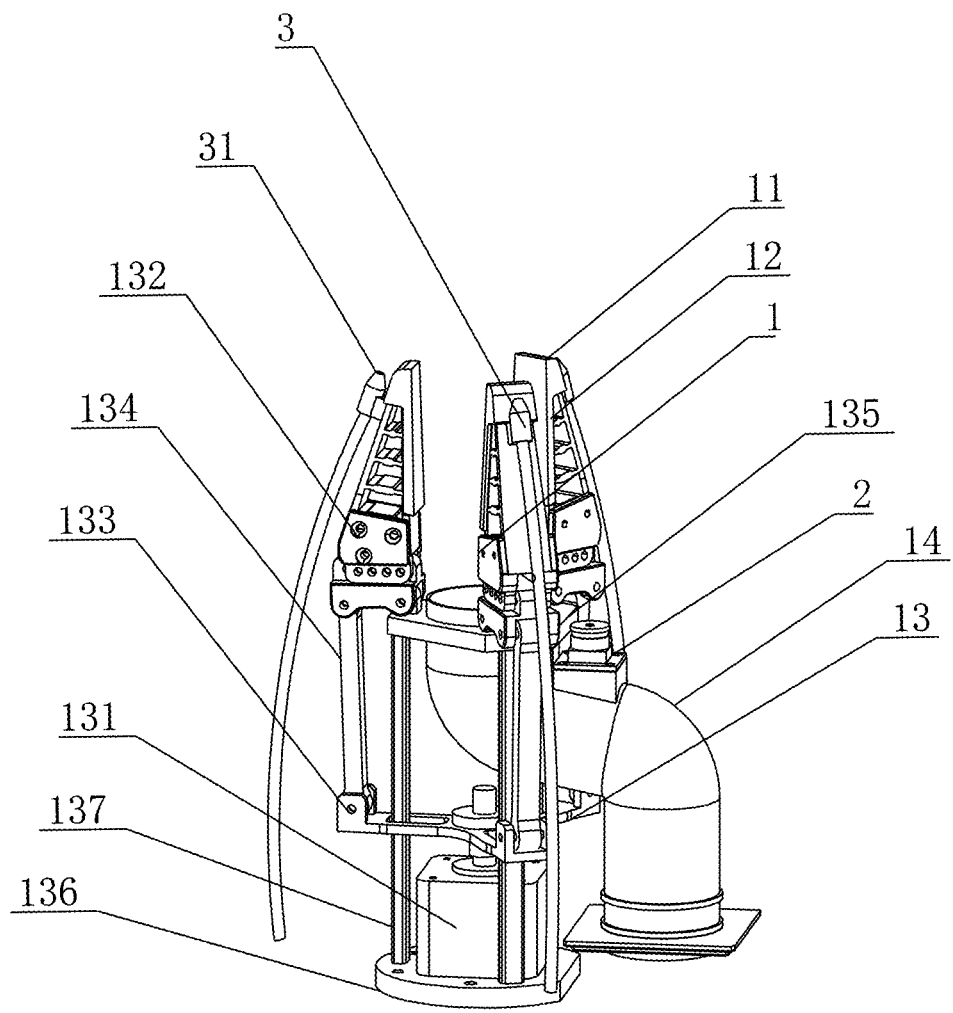
FIG. 2 is a schematic diagram of a mechanical claw according to an exemplary embodiment.
Figure 3:
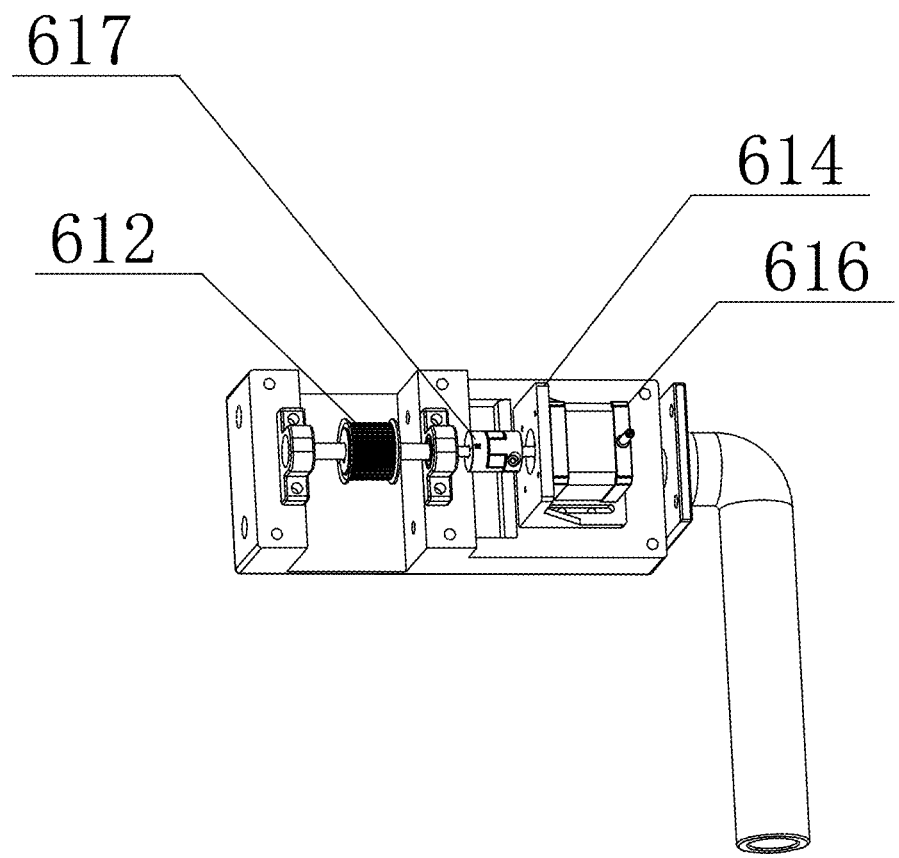
FIG. 3 is a schematic diagram of a second driving mechanism according to an exemplary embodiment.
Figure 4:
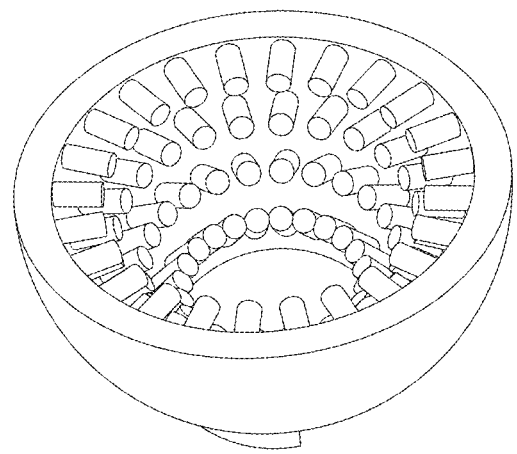
FIG. 4 is a schematic diagram of a fruit rack according to an exemplary embodiment.
Figure 5:
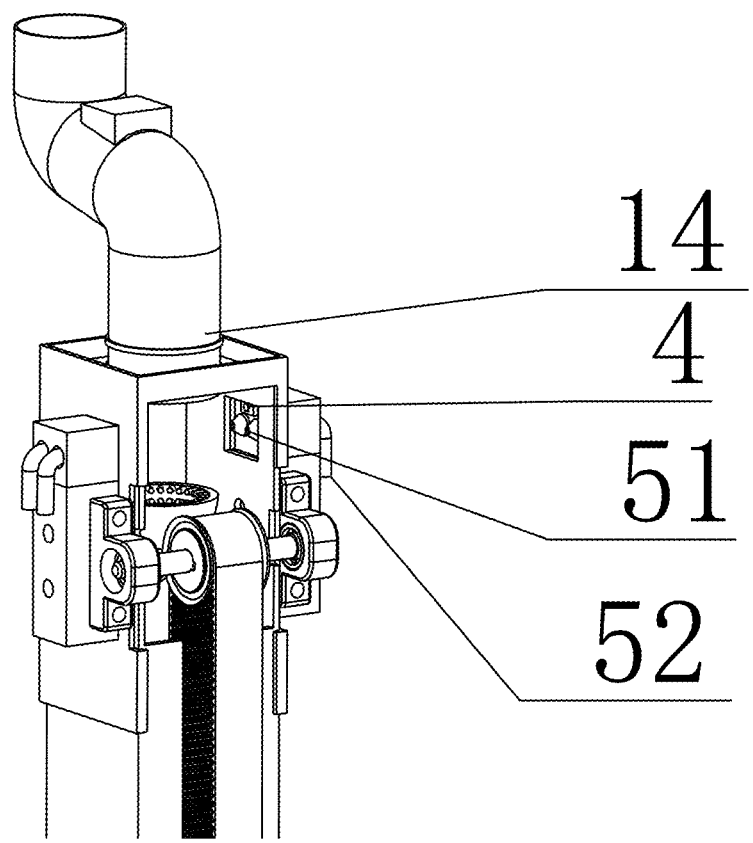
FIG. 5 is a schematic diagram of a liquid polyurethane foam spraying device according to an exemplary embodiment.

The reference signs are as follows:
1. mechanical claw; 11. flexible finger; 12. pressure sensor; 13. first driving mechanism; 131. first motor; 132. crank; 133. slider; 134. connecting rod; 135. upper fixing plate; 136, lower fixing plate; 137, guide rod; 14, collecting pipe;
2. image recognition device;
3. carbon dioxide spraying device; 31. first nozzle; 32. first pipeline;
4. photoelectric sensor;
5. liquid polyurethane foam spraying device; 51. second nozzle; 52. second pipeline;
6. transport device; 61. conveyor belt mechanism; 611. machine body; 612. active pulley; 613. follower pulley; 614. second driving mechanism; 615. belt; 616. second motor; 617. coupling; 62. fruit rack.

DESCRIPTION OF EMBODIMENTS

Exemplary embodiments will be described in detail herein, examples of which are illustrated in the accompanying drawings.

Referring to FIGS. 1-5, an embodiment of the present disclosure provides an electric bayberry picker with direct cooling and fast encapsulation based on machine vision, which includes a mechanical claw 1, an image recognition device 2, a carbon dioxide spraying device 3, a photoelectric sensor 4, a liquid polyurethane foam spraying device 5, a transportation device 6, and a control processing device. The mechanical claw 1 has at least three flexible fingers 11, each flexible finger 11 is equipped with a pressure sensor on one side facing the bayberry, and a collecting pipe is arranged at an enclosing center of all the flexible fingers 11. The image recognition device 2 is configured for positioning and maturity recognition of the bayberry. The carbon dioxide spraying device 3 is configured to spray carbon dioxide on a fruit stalk and around the bayberry to freeze the fruit stalk and reduce the surface temperature of the bayberry. The photoelectric sensor 4 is configured to detect whether a bayberry exits an outlet of the collecting pipe 14. The liquid polyurethane foam spraying device 5 is configured to wrap liquid polyurethane foam on the bayberry exited the outlet of the collecting pipe. The transportation device 6 is configured to transport out the bayberry wrapped with liquid polyurethane foam. The transport device 6 includes a conveyor belt mechanism 61 and a fruit rack 62 fixed on the conveyor belt mechanism 61, and the fruit rack 62 moves along with a conveyor belt on the conveyor belt mechanism 61. The control processing device is configured to control the carbon dioxide spraying device 3 to spray carbon dioxide on the fruit stalk and around the bayberry according to positioning and recognition results of the image recognition device 2; control the mechanical claw 1 to grasp the bayberry; control grasping strength of the mechanical claw 1 according to pressure signals collected by the pressure sensors; control the mechanical claw 1 to release the bayberry and allow the same to drop into the collecting pipe 14 automatically after being tugged and picked; control the liquid polyurethane foam spraying device 5 to spray liquid polyurethane foam at the bayberry once the photoelectric sensor 4 detects that the bayberry exits the outlet of the collecting pipe 14; and control the transporting device 6 to transport out the bayberry which has fallen into the fruit rack 62 after being wrapped with liquid polyurethane foam.

The existing bayberry picking machinery faces problems such as the inability to guarantee the fruit quality, the tendency to damage the fruit, reliance on a single picking mode, and inefficiency in assisting manual picking. Given this, the present disclosure utilizes carbon dioxide to cool the surface of the fruit and freeze the fruit stalk before picking, which improves the surface quality of the picked fruit and facilitates its preservation. Furthermore, the mechanical claw is equipped with flexible picking fingers that skillfully form a deformable multi-rod mechanism, which combines with the integrated film pressure sensors 12 thereof, this allows the mechanical claw of the electric bayberry picker to deform according to the shape of the fruits, adjust the grasping force based on the size of the bayberry, and thus achieve fruit picking with minimal loss. After passing through the collecting pipe, the picked fruits are wrapped in liquid polyurethane foam and transferred to the belt transport device 6 equipped with a flexible buffer rack before finally being transported to the collection device.

In one embodiment, the mechanical claw 1 includes at least three flexible fingers 11, a plurality of pressure sensors 12, a first driving mechanism 13, and a collecting pipe 14. The first driving mechanism 13 drives the three flexible fingers 12 to converge or expand simultaneously. A side of each flexible finger 11 facing the bayberry is equipped with one pressure sensor 12, and an inlet of the collecting pipe is positioned within an area enclosed by all three flexible fingers 11. When the flexible claw fingers execute the picking operations, the three evenly spaced claw fingers ensure that pressure controlled by the pressure sensors is uniformly transmitted to the surface of the bayberry, which prevents damage to the fruit. To facilitate the falling of the picked bayberries into the collecting pipe, the collecting pipe is arranged at the geometric centers of three flexible claw fingers.

In one embodiment, the first driving mechanism 13 includes a crank-slider mechanism and a first motor 131. A root end of each flexible finger is installed on a crank 132 of the crank-slider mechanism, and the first motor 131 drives a slider 133 of the crank-slider mechanism to move along a telescopic straight line. When picking, the first driving mechanism 13 provides power for the flexible fingers to perform the picking operation. The structure of the driving mechanism is simple and reliable.

Further, the crank-slider mechanism includes a stand, the crank 132, the slider 133, and a connecting rod 134. The stand includes an upper fixing plate 135, a lower fixing plate 136, and a plurality of guide rods 137 fixedly connecting the upper fixing plate 135 and the lower fixing plate 136. The flexible fingers 11 are fixed on the crank 132, one end of the crank 132 is hinged on the upper fixing plate 135, an upper end of the collecting pipe 14 may be fixed on the upper fixing plate 135, and the other end of the crank 132 is hinged to one end of the connecting rod 134, while the other end of the connecting rod 134 is hinged to the slider 133. The slider 133 is slidably disposed on the guide rod 137. The first motor 131 is fixed on the lower fixing plate 136. A central portion of the slider 133 is further provided with internal threads (or a nut may also be mounted therein), while an output shaft of the first motor 131 is provided with external threads (or an output shaft of the first motor 131 is fixedly connected with a lead screw). The internal threads are in a rotating fit with the external threads (or the nut is in a driving fit with the lead screw). Through rotation of the first motor 131, the slider 133 is driven to slide up or down along the guide rod 137, which in turn drives the connecting rod 134, the crank 132 and the flexible fingers 11 to move in sequence, thus achieving grasping and releasing operations of the three flexible fingers 11. When picking, the first driving mechanism 13 supplies power to the flexible fingers to perform the picking operations, and a stepper motor is used as the power source. Since the rotation of the lead screw is converted into movement of the slider 133, the flexible claw fingers are allowed to grasp with high accuracy, minimizing the damage to the fruits.

In one embodiment, the image recognition device 2 includes a camera that transmits collected images to the control processing device. When picking, the control processing device controls the carbon dioxide spraying device, the mechanical claws, and other devices based on the images captured by the camera, thus achieving semi-automatic picking and reducing complex control steps. The image recognition device can determine the maturity of fruits, thereby reducing the likelihood of mistakenly picking unripe fruits and casing the labor intensity of picking.

In one embodiment, the carbon dioxide spraying device 3 includes a first nozzle 31, a first pipeline 32, a gas valve, and a gas cylinder containing carbon dioxide. The first nozzle 31 is connected to the gas cylinder through the first pipeline 32, the gas valve is arranged on the first pipeline 32 to control on/off thereof, and the gas valve is controlled by the control processing device. When picking, three evenly spaced carbon dioxide nozzles spray carbon dioxide gas in a focused manner directly toward the bayberry fruit, effectively lowering the surface temperature of the fruit and freezing the fruit stalk. This helps reduce the difficulty of picking and facilitates the preservation of the picked fruit.

In one embodiment, the liquid polyurethane foam spraying device 5 includes a second nozzle 51, a second pipeline 52, a solenoid valve, and a liquid polyurethane tank. The second nozzle 51 is connected to the liquid polyurethane tank through the second pipeline 52. The solenoid valve is arranged on the second pipeline 52 to control the on/off of the second pipeline 52, and the solenoid valve is controlled by the control processing device. When picking, the photoelectric sensor located under the collecting pipe detects the presence of the fallen bayberry, and the liquid polyurethane foam nozzle sprays foam toward the bayberry fruit to cover its surface, which reduces the collision and friction of the bayberry during subsequent transportation.

In one embodiment, the conveyor belt mechanism 61 includes a machine body 611, an active pulley 612, a follower pulley 613, a second driving mechanism 614, and a belt 615. The belt 615 is mounted between the active pulley 612 and the follower pulley 613, and the second driving mechanism 614 is configured to drive the active pulley 612 to rotate. The active pulley 612 and the follower pulley 613 are installed on the machine body 611 through bearing seats. When picking, the bayberries falling from the collecting pipe are transported to the collection device by the conveyor belt mechanism. A synchronous belt is chosen as the transport carrier due to its lightweight nature, smooth transmission and fixed transmission ratio, and ability to withstand a certain impact load.

Further, the second driving mechanism 614 includes a second motor 616, and a coupling 617. The second motor 616 and the active pulley 612 are connected through the coupling 617. A plum blossom coupling may be used to provide power for the active pulley, which has the advantages of low cost and reliable operation.

To facilitate hand-holding, handles are installed on both sides of the body 611.

To reduce the weight of the picker, the main components, such as the machine body 611 may be made of carbon fiber, making the entire machine light in weight, and high in strength and durability.

Figure 6:
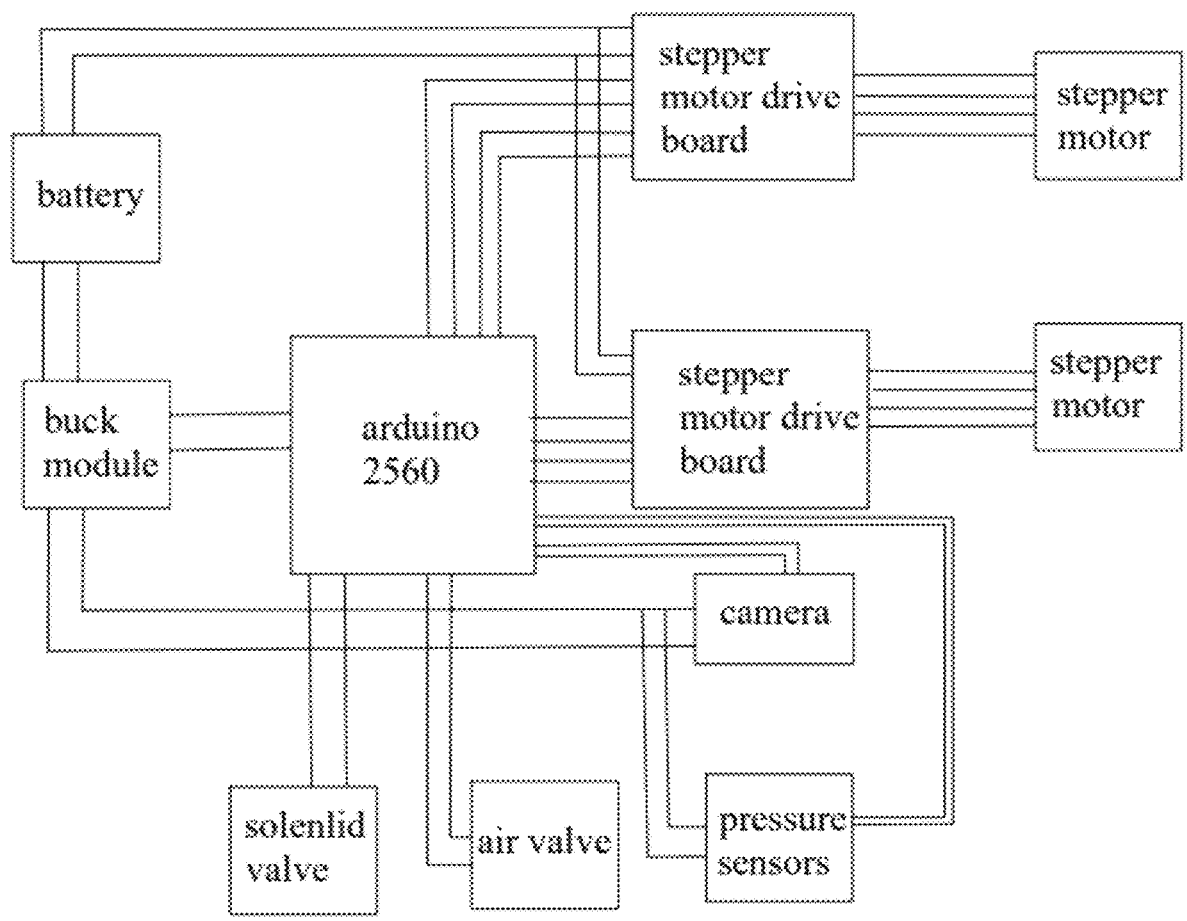
FIG. 6 is a simplified circuitry schematic diagram according to an exemplary embodiment.

In one embodiment, as shown in FIG. 6, the control processing device includes an Arduino 2560 development board, a stepper motor drive board, a buck module, and a battery. The stepper motor drive board is connected to the first motor 131 and the second motor 616 respectively. The battery supplies power to the Arduino 2560 development board, the plurality of pressure sensors 12, the camera, photoelectric sensor 4, the air valve, and the solenoid valve through the buck module. In addition, the battery also supplies power to the first motor 131 and the second motor 616. The control processing device is integrated on a circuit board, which is a micro-stepping motor driver board, enhancing the integration level of the circuit board and consequently reducing the size of the control processing device. The connection line between the control processing device and the picker utilizes a highly integrated aviation connector, making the assembly more convenient and reliable.

In one embodiment, locating and identifying the maturity of bayberry includes the following steps of:
pre-processing: uniformly cropping collected images to sizes of 512×512 pixels, with a bilateral filtering algorithm chosen to remove image noise;
segmenting and obtaining binary images: color-space converting the filtered images, selecting an "a" component of Lab color space and "U" and "V" components of YUV space to create the binary images by using a histogram global threshold method, and performing a morphological filtering operation to obtain the binary images of fruit targets that are overlapped and occluded;
extracting a single target from fruit images: segmenting the binary images of the fruit targets that are overlapped and occluded by using a Hough transform, setting center constraints, removing non-compliant centers, and determining centers, pixel sizes, and numbers of overlapping and occluded fruits; and
identifying maturity: utilizing a Maximum Between-Class Variance (Otsu) Method for image segmentation, converting segmented bayberry images from RGB color space to Lab color space, extracting values of three Lab channels, determining that the maturity is only related to a ratio of "a" value to "b" value after data analysis, and setting a/b as maturity threshold, where if a/b is less than 1, classifying corresponding fruit as immature bayberries, if a/b is greater than 1 but less than 1.2, classifying corresponding fruit as about to mature, and if a/b is greater than 1.2, classifying corresponding fruit as mature.

In one embodiment, a part of the fruit rack 62 that is in contact with the bayberry is made of silicone material, and a columnar flexible buffer structure is integrated inside the fruit rack 62. When picking, the bayberry fruit falls into the fruit rack, and the columnar flexible buffer structure inside the fruit rack is pressurized and deformed to fit the shape of the bayberry. This effectively offsets the impact and reduces the rolling friction to the fruit inside the rack, thereby reducing the damage to fruits during transportation.

Figure 7:
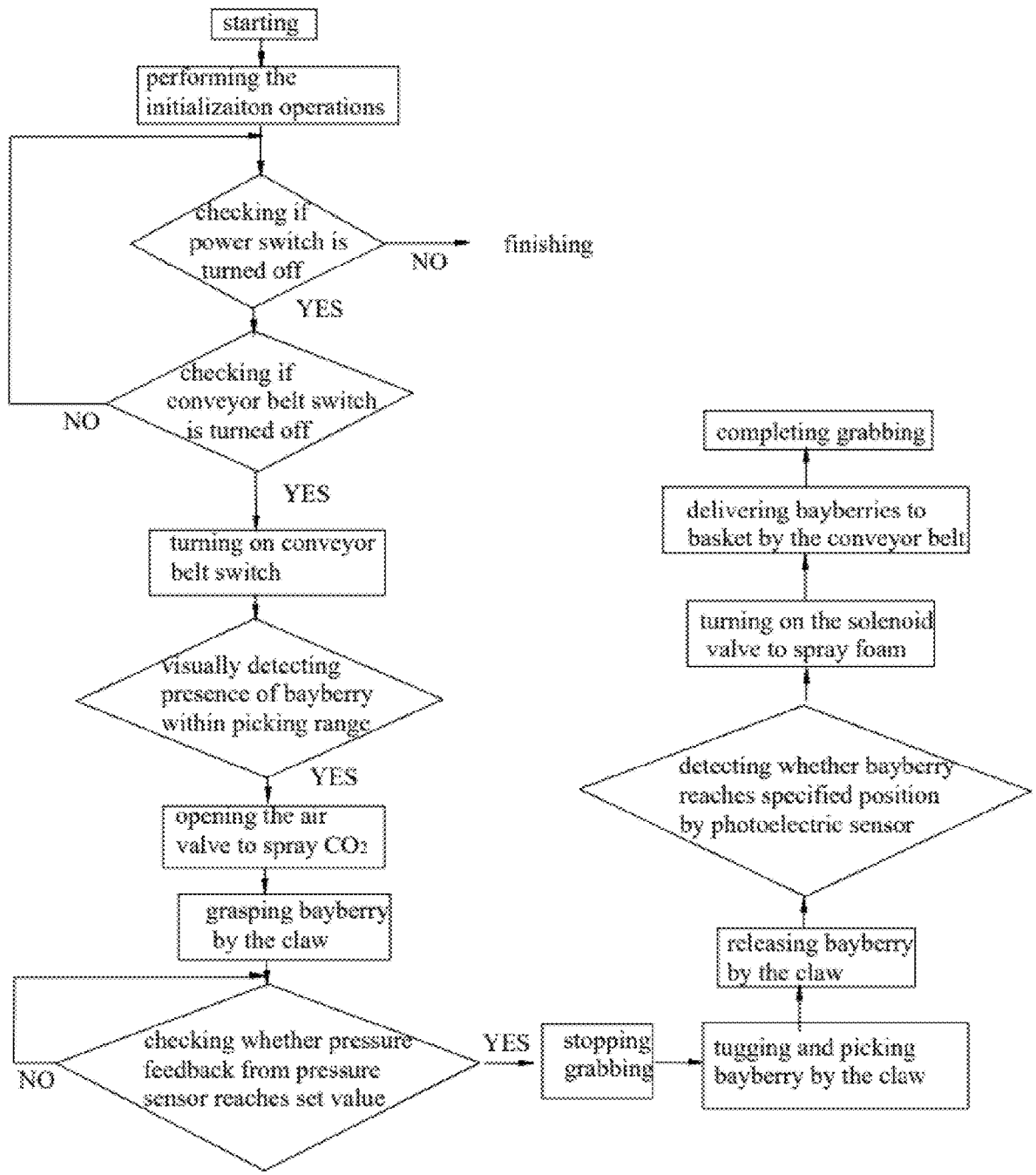
FIG. 7 is a control flowchart illustrated according to an exemplary embodiment.

The usage method of the electric bayberry picker according to the present disclosure is described as follows:

Referring to FIG. 7, firstly the power switch that is located at the handle at the end of the machine body is turned on to supply power to the picker, and the positioning and maturity recognition of the bayberries are carried out by the image recognition device. When the condition of the bayberries falls within the picking range and the maturity reaches the preset level, the carbon dioxide gas valve is opened to spray carbon dioxide under the control of the Arduino 2560 development board, and the spraying is stopped after 2 seconds. The mechanical claw 1 controlled by the first motor converges automatically and grabs the fruit. The grabbing force is controlled by the film pressure sensors 12 integrated into the flexible picking claw, wherein the flexible picking claw will undergo elastic deformation according to the actual shape of the fruit, which increases the contact area and reduces damage to the fruit. After the fruit is picked, the mechanical claw is controlled by the first motor 1 to release by pressing the reset button at the handle at the end of the machine body. When the fruit falls downwardly and passes through the collecting pipe 14, a signal is sent to the Arduino 2560 development board by the photoelectric sensor 4 integrated under the collecting pipe after capturing the bayberry, the solenoid valve is controlled to open and spray liquid polyurethane foam by the development board. The bayberry wrapped with the foam falls into the fruit rack 62 of the belt transport device 6, and finally, the fruit is transferred to the fruit collection device by a second motor that drives the conveyor belt.

The invention claimed is:

1. An electric bayberry picker with direct cooling and fast encapsulation based on machine vision, comprising:
  a mechanical claw with at least three flexible fingers each equipped with a pressure sensor on a side facing a bayberry, with a collecting pipe arranged at an enclosing center of all the flexible fingers;
  an image recognition device configured for positioning and recognizing maturity of the bayberry;
  a carbon dioxide spraying device configured to spray carbon dioxide on a fruit stalk and around the bayberry to freeze the fruit stalk and reduce surface temperature of the bayberry;
  a photoelectric sensor configured to detect whether a bayberry exits an outlet of the collecting pipe;
  a liquid polyurethane foam spraying device for wrapping the bayberry exited the outlet of the collecting pipe with liquid polyurethane foam;
  a transport device configured for transporting the bayberry wrapped with liquid polyurethane foam, wherein the transport device comprises a conveyor belt mechanism and a fruit rack fixed on the conveyor belt mechanism, and the fruit rack moves along with a conveyor belt on the conveyor belt mechanism; and
  a control processing device configured to control the carbon dioxide spraying device to spray carbon dioxide on the fruit stalk and around the bayberry according to positioning and recognition results of the image recognition device; control the mechanical claw to grasp the bayberry; control grasping strength of the mechanical claw according to pressure signals collected by pressure sensors; control the mechanical claw to release the bayberry to allow the same to drop into the collecting pipe automatically after being tugged and picked; control the liquid polyurethane foam spraying device to spray liquid polyurethane foam on the bayberry after the photoelectric sensor detects that the bayberry exits the outlet of the collecting pipe; and control the transporting device to transport the bayberry that has fallen into the fruit rack after being wrapped with liquid polyurethane foam.

2. The electric bayberry picker with direct cooling and fast encapsulation based on machine vision according to claim 1, wherein the mechanical claw comprises the at least three flexible fingers, a plurality of pressure sensors, a first driving mechanism, and the collecting pipe, wherein the first driving mechanism drives all the flexible fingers to converge or expand simultaneously, a side of each flexible finger facing the bayberry is equipped with one pressure sensor, and an inlet of the collecting pipe is situated in an area enclosed by all the flexible fingers.

3. The electric bayberry picker with direct cooling and fast encapsulation based on machine vision according to claim 2, wherein the first driving mechanism comprises a crank-slider mechanism and a first motor, a root end of each flexible finger is installed on a crank of the crank-slider mechanism, and the first motor drives a slider of the crank-slider mechanism to move along a telescopic straight line.

4. The electric bayberry picker with direct cooling and fast encapsulation based on machine vision according to claim 1, wherein the image recognition device comprises a camera that transmits collected images to the control processing device.

5. The electric bayberry picker with direct cooling and fast encapsulation based on machine vision according to claim 1, wherein the carbon dioxide spraying device comprises a first nozzle, a first pipeline, an air valve, and a gas cylinder containing carbon dioxide, wherein the first nozzle is connected to the gas cylinder through the first pipeline, the air valve is arranged on the first pipeline to control on/off thereof, and the air valve is controlled by the control processing device.

6. The electric bayberry picker with direct cooling and fast encapsulation based on machine vision according to claim 1, wherein the liquid polyurethane foam spraying device comprises a second nozzle, a second pipeline, a solenoid valve and a liquid polyurethane tank, wherein the second nozzle is connected to the liquid polyurethane tank through the second pipeline, the solenoid valve is arranged on the second pipeline to control on-off thereof, and the solenoid valve is controlled by the control processing device.

7. The electric bayberry picker with direct cooling and fast encapsulation based on machine vision according to claim 1, wherein the conveyor belt mechanism comprises an active pulley, a follower pulley, a second driving mechanism, and the conveyor belt mounded between the active pulley and the follower pulley, and the second drive mechanism drives the active pulley to rotate.

8. The electric bayberry picker with direct cooling and fast encapsulation based on machine vision according to claim 7, wherein the second driving mechanism comprises a second motor and a coupling, and the second motor is connected to the active pulley through the coupling.

9. The electric bayberry picker with direct cooling and fast encapsulation based on machine vision according to claim 1, wherein the positioning and recognizing maturity of the bayberry comprises steps of:

pre-processing: uniformly cropping collected images to sizes of 512×512 pixels, with a bilateral filtering algorithm selected to eliminate image noise;

segmenting images and obtaining binary images: color-space converting the filtered images, selecting an "a" component of Lab color space and "U" and "V" components of YUV space to creating the binary images by using a histogram global threshold method, and performing a morphological filtering operation to obtain the binary images of overlapping and occluded fruit targets;

extracting a single target from fruit images: using a Hough transform to segment the binary images of the overlapping and occluded fruit targets, setting circle center constraints, eliminating non-compliant circle centers, and finally determining circle centers, pixel sizes, and numbers of overlapping and occluded fruits; and identifying maturity: utilizing a Maximum Between-Class Variance Method for image segmentation, converting the segmented bayberry images from RGB color space to Lab color space, extracting values of three Lab channels, determining that the maturity is only related to a ratio of "a" value to "b" value after data analysis, and setting a/b as a threshold for maturity classification, where if a/b is less than 1, classifying corresponding fruit as immature, if a/b is greater than 1 but less than 1.2, classifying corresponding fruit as about to mature, and if a/b is greater than 1.2, classifying corresponding fruit as mature.

10. The electric bayberry picker with direct cooling and fast encapsulation based on machine vision according to claim 1, wherein a part of the fruit rack that contacts the bayberry is made of silicone material, and a columnar flexible buffer structure is integrated inside the fruit rack.

* * * * *